United States Patent
Shotwell

(10) Patent No.: US 10,718,165 B2
(45) Date of Patent: Jul. 21, 2020

(54) ROLLER REAMER INTEGRAL PRESSURE RELIEF ASSEMBLY

(71) Applicant: Duane Shotwell, Conroe, TX (US)

(72) Inventor: Duane Shotwell, Conroe, TX (US)

(*) Notice: Subject to any disclaimer, the term of this patent is extended or adjusted under 35 U.S.C. 154(b) by 269 days.

(21) Appl. No.: 15/828,299

(22) Filed: Nov. 30, 2017

(65) Prior Publication Data

US 2019/0162026 A1    May 30, 2019

(51) Int. Cl.
| | |
|---|---|
| *E21B 10/24* | (2006.01) |
| *E21B 10/30* | (2006.01) |
| *F16K 17/04* | (2006.01) |
| *F16J 15/34* | (2006.01) |
| *E21B 10/22* | (2006.01) |

(52) U.S. Cl.
CPC .............. *E21B 10/24* (2013.01); *E21B 10/30* (2013.01); *F16J 15/344* (2013.01); *F16K 17/04* (2013.01); *E21B 2010/225* (2013.01)

(58) Field of Classification Search
CPC .... E21B 10/24; E21B 10/30; E21B 2010/225; F16K 17/04; F16J 15/344
See application file for complete search history.

(56) References Cited

U.S. PATENT DOCUMENTS

| | | | | |
|---|---|---|---|---|
| 3,866,695 | A * | 2/1975 | Jackson | E21B 10/24 |
| | | | | 175/228 |
| 3,977,481 | A * | 8/1976 | Fisk | E21B 10/52 |
| | | | | 175/228 |
| 4,182,425 | A * | 1/1980 | Garrett | E21B 10/24 |
| | | | | 175/228 |
| 4,189,012 | A * | 2/1980 | Garrett | E21B 10/30 |
| | | | | 175/312 |
| 4,378,058 | A * | 3/1983 | Allison | E21B 10/30 |
| | | | | 175/228 |
| 5,033,558 | A * | 7/1991 | Russo | E21B 7/068 |
| | | | | 175/325.3 |
| 6,386,299 | B1 * | 5/2002 | Kato | E21B 7/28 |
| | | | | 175/385 |
| 7,997,659 | B2 * | 8/2011 | Oertley | E21B 10/12 |
| | | | | 175/364 |
| 8,783,786 | B2 * | 7/2014 | Shanahan | A61K 45/06 |
| | | | | 299/106 |

(Continued)

FOREIGN PATENT DOCUMENTS

EP        0274265 A2 *  7/1988  ............. E21B 10/30

*Primary Examiner* — Daniel P Stephenson
(74) *Attorney, Agent, or Firm* — Patrick Reilly

(57) ABSTRACT

An integral pressure relief assembly is comprised within a roller assembly of a roller reamer. The integral pressure relief assembly extends through a pair of pillow blocks and a bearing shaft of a retention assembly of the roller assembly. A volume of lubricant is inserted under pressure through a relief valve into an interior channel of the bearing shaft. A spring element in combination with an elastomeric piston provides additional pressure to the pressurized volume of lubricant contained within the integral pressure relief assembly. The lubricant absorbs heat from motion of the bearing shaft and a cutter assembly. As the lubricant increases in pressure, the relief valve releases lubricant from the bearing shaft when a sufficient differential pressure between the contained lubricant and the outside environment is achieved.

25 Claims, 13 Drawing Sheets

(56) References Cited

U.S. PATENT DOCUMENTS

| | | | |
|---|---|---|---|
| 2005/0252694 A1* | 11/2005 | Kennedy | E21B 10/24 175/406 |
| 2008/0202818 A1* | 8/2008 | McManus | E21B 10/24 175/393 |
| 2009/0194335 A1* | 8/2009 | Kennedy | E21B 10/24 175/228 |
| 2011/0100722 A1* | 5/2011 | McManus | E21B 10/24 175/406 |
| 2013/0133954 A1* | 5/2013 | Mohon | E21B 10/28 175/345 |
| 2019/0162026 A1* | 5/2019 | Shotwell | F16J 15/344 |
| 2019/0162027 A1* | 5/2019 | Shotwell | E21B 10/25 |
| 2019/0162028 A1* | 5/2019 | Shotwell | E21B 10/25 |

* cited by examiner

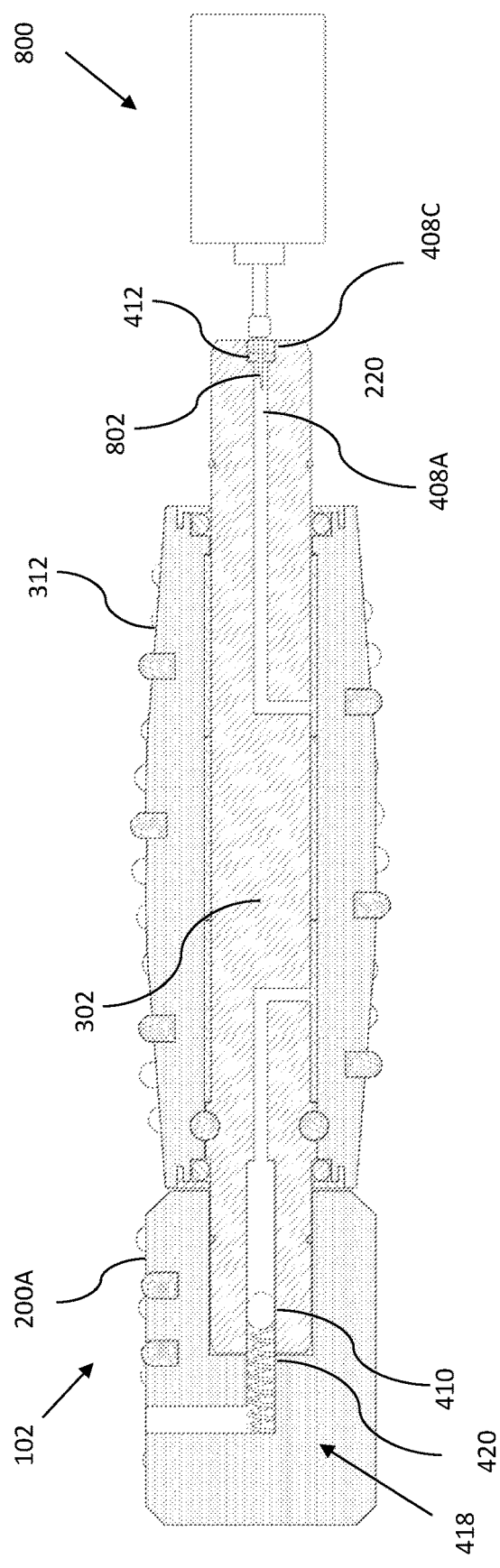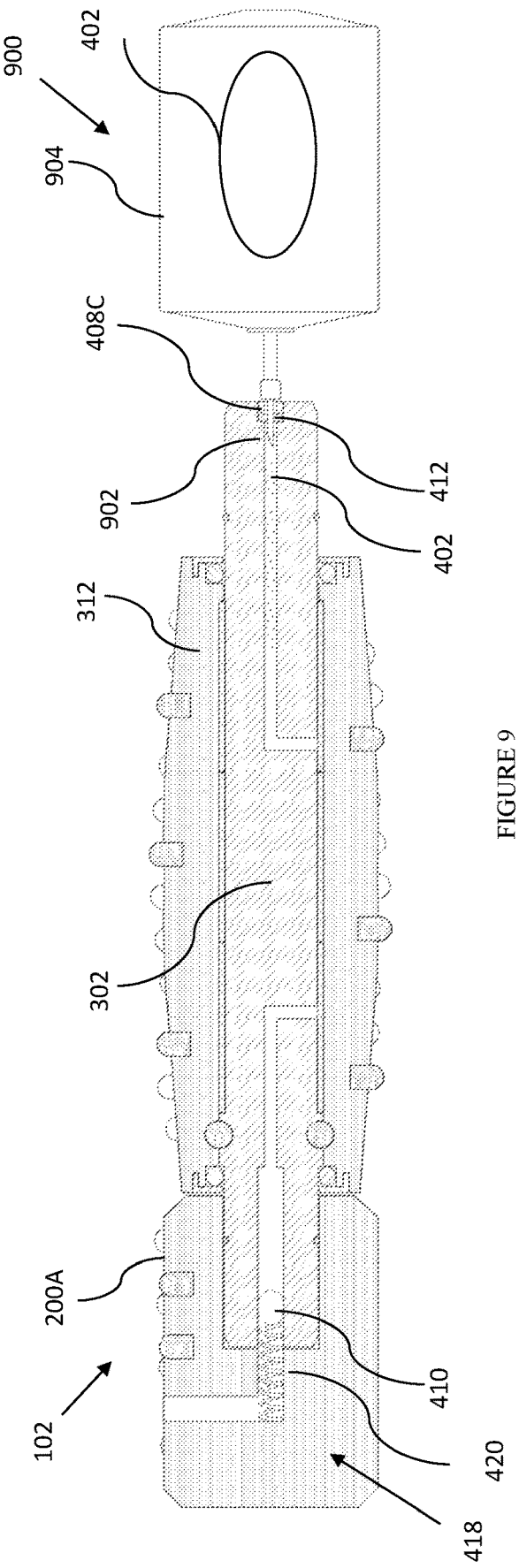
FIGURE 8
FIGURE 9

ROLLER REAMER INTEGRAL PRESSURE RELIEF ASSEMBLY

FIELD OF THE INVENTION

The present invention relates generally to underground boring and, in particular, to a reamer assembly for enlarging or maintaining a clearance diameter of an existing borehole. More particularly, the present invention relates methods and devices that enable lubrication of a roller reamer while impeding pollution of a roller reamer lubricant with borehole ambient materials.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Reamers for enlarging boreholes drilled for oil wells and mine shafts have been known in the drilling art for many decades. Typically, a reamer includes a central body having three or more roller reamer units mounted at circumferentially spaced intervals around the tool body. The reamer tool is mounted in a string of drill pipe (drill collars) or other rotatable pipe such that the reamer is rotated with the drill pipe through the well bore in order to enlarge the bore. The roller reamer units rollably engage the well bore wall to enlarge the bore as the drill string moves through the hole. Roller reamers are used to roll against the borehole wall of an in-gauge borehole to reduce the torque of the drill collars against the borehole wall of a directionally drilled hole. An example of a roller reamer tool is found in U.S. Pat. No. 3,977,481 of Fisk which discloses three roller reamer units mounted on a tool body. Each roller unit includes a centrally mounted shaft having the roller mounted onto the bearing shaft for rotation therewith. The bearing shaft and roller mount upper and lower thrust bearings and seal rings to seal off an internal region between the bearing shaft and the roller. This internal region is lubricated utilizing a pressure balancing internal piston to maintain lubrication in spite of variations in pressure surrounding the tool. Protecting the roller reamer lubricant, e.g., grease, from pollution from the borehole environment and managing the increased pressure of a roller reamer lubricant pressure due to heat generated by operational friction are both long-felt needs in the art.

Another example of such a roller reamer is found in U.S. Pat. No. 4,182,425 of Garrett which discloses in several embodiments roller reamers having a variety of features. These roller reamers are mounted in position on cylindrical bearing blocks which fit in cylindrical recesses in the tool body. The roller reamers include rollers or cutters which are mounted onto a stationary shaft and are held against thrust by a series of ball bearings or, in a different embodiment, by a thrust flange. Additionally, a lubricant is sealed in between the stationary shaft and the rollers. The lubricant may be held in the region between the stationary shaft and the rotating roller or cutter by means of a flexible diaphragm which acts to equalize the pressure within the lubricating region.

Roller assemblies of roller reamers are generally intended to be coupled with a reamer body, or tool body, yet freely rotate about an axis of a dedicated shaft that is parallel with a central axis of the tool body. One problem with roller reamers is that under the conditions commonly encountered during drilling, rock chips and other debris can build up proximate to one or more roller assemblies, which may jam or slow rotation of the roller assemblies, thereby reducing their effectiveness. Also, even under normal operating conditions, rotation of the roller assemblies can also cause a roller assembly to increase in temperature which further increases the stress on the rotating parts and the pressure of the contained lubricant. Increased stress may cause those rotating parts to wear more quickly. This is a costly problem because the reamer will have to be brought to the surface, dismantled and reassembled.

The prior art teaches that lubricant may be supplied interstitially between a roller assembly and a shaft about which the roller assembly is positioned. It is vital to the operation of the roller reamer that the lubricant and the roller assemblies avoid pollution of the roller lubricant under high temperatures and pressures. Yet the prior art fails to optimally address the needs of roller reamers to provide adequate volumes of unpolluted lubricant between the bearing shaft and the roller assembly for prolonged periods and to reduce the frequency of required above-ground maintenance on the reamer assembly and the comprising reamer. The prior art also fails optimally compensate for the increase in pressure experienced by the reamer lubricant in high temperature operations.

It is an object of the present invention to provide a useful alternative means to both impede pollution of lubricant within a roller reamer during use in a downhole environment and to permit lubricant to escape from containment within a roller reamer at preselected lubricant pressures.

SUMMARY AND OBJECTS OF THE INVENTION

Towards these and other objects of the present invention (hereinafter, "the invented roller reamer") that are made obvious to one of ordinary skill in the art in light of the present disclosure, an invented roller reamer having an invented integral pressure relief assembly comprised a within a bearing shaft about which a roller cutter is rotatably positioned. The bearing shaft is additionally detachably coupled at opposing ends to a reservoir pillow block at a first shaft end and to a relief pillow block at a second shaft end.

The roller cutter, bearing shaft, reservoir pillow block and relief pillow block in combination at least partly form a cutter cartridge when detachably assembled. The cutter cartridge is configured for placement into an axial recess of a tool body of the invented roller reamer. A first wedge is configured, shaped and sized for detachable attachment with the tool body and is adapted to maintain the reservoir pillow block within the axial recess during operation of the invented roller reamer. A second wedge is configured, shaped and sized for detachable attachment with the tool body and is adapted to maintain the relief pillow block within the axial recess during operation of the invented roller reamer.

Certain alternate preferred embodiments of the invented roller reamer include two or more cutter cartridges coupled with a same tool body, wherein each cutter cartridge at least partially comprises a separate pressure relief assembly.

Certain additional alternate preferred embodiments of the invented reamer include six cutter cartridges coupled with another alternative tool body, wherein each cutter cartridge at least partially comprises a separate pressure relief assembly.

In one alternate preferred embodiment of the pressure relief assembly, a lubricant reservoir formed in the first end of the bearing shaft of a cutter cartridge forces lubricant under pressure interstitially between the bearing shaft and the roller cutter. The pressure applied to drive lubricant from the lubricant reservoir and toward the bearing shaft is of a ambient pressure force received from an external environment of the invented roller reamer optionally combined with a spring pressure force, wherein the spring pressure force is generated within the bearing shaft. Lubricant pressure may optionally place a source of the spring pressure force under compression.

In other alternate preferred embodiments of the pressure relief assembly, additionally, optionally or alternatively, a volume of lubricant extends from the interstitial volume defined by a cutter and the bearing shaft and towards the second end of the bearing shaft and distally from the lubricant reservoir. A pressure relief valve is shaped, sized and positioned to permit lubricant to escape from the interstitial volume formed by the roller cutter and bearing shaft at a lubricant pressure that is at least higher than the ambient pressure. The pressure relief valve may be adapted to release pressure above a preselected pressure differential between the ambient pressure and the lubricant pressure generated within the cutter cartridge.

The performance of the pressure relief valve in enabling release of lubricant from the bearing shaft may be determined by several factors, to include (1.) the shape of the valve; (2.) the durometric and elastic parameters of the material forming the pressure relief valve; (3.) the characteristics of a lubricant insertion needle applied to pierce the pressure relief valve in inserting lubricant into the bearing shaft; and (4.) less often, the characteristics of a vacuum insertion needle applied to pierce the pressure relief valve, a process of establishing near vacuum pressure within the invented integral pressure relief assembly and in preparation of inserting lubricant into the invented integral pressure relief assembly. It is understood that the lubricant insertion needles applied to the pressure relief valve are generally larger than and therefore effectively overwhelms the effect of the vacuum insertion needles applied to a same pressure relief valve.

Certain yet other alternate preferred embodiments of the invented roller reamer optionally include one or more of the features of: (a.) a plurality of ball bearings disposed within a race positioned about and circling the bearing shaft in a plane normal to the central tool axis; (b.) a plurality of cutting inserts positioned along an outer surface of the roller cutter; (c.) at least one cutting insert of the roller cutter having a central depression extending toward the central tool axis; (d.) at least one cutting insert of the roller cutter comprising tungsten carbide; and (e.) at least one cutting insert of the roller cutter comprising polycrystalline diamond.

Certain preferred embodiments of the method of the present invention (hereinafter, "the invented method") include one or more of the aspects of (a.) causing a low pressure state within the cutter cartridge or the bearing shaft prior to inserting lubricant into the invented integral pressure relief assembly; (b.) using an annular needle to pierce the pressure relief valve and drive lubricant under pressure into the bearing shaft; (c.) after first forming a low pressure state within the bearing shaft and then inserting lubricant into the bearing shaft, placing a detachably assembled cutter cartridge comprising the bearing shaft into an axial recess of the tool body of the invented roller reamer; and (d.) after placing the cutter cartridge into an axial recess of the tool body of the invented roller reamer, positioning and detachably attaching a pair of wedges to the tool body such that the cutter cartridge is operationally coupled with the tool body.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

The present disclosure incorporates by reference the two previously filed US Nonprovisional Patent Applications, in their entirety and for all purposes, of U.S. Nonprovisional patent application Ser. No. 15/456,415, filed on Mar. 10, 2017, and titled REAMER FOR USE IN DRILLING OPERATIONS; and U.S. Nonprovisional patent application Ser. No. 15/387,875 filed on Dec. 22, 2016 and titled REAMER CUTTING INSERT FOR USE IN DRILLING OPERATIONS.

BRIEF DESCRIPTION OF THE FIGURES

The detailed description of some embodiments of the invention is made below with reference to the accompanying figures, wherein like numerals represent corresponding parts of the figures.

FIG. 8 is a detailed cut-away side view of the first preferred embodiment of the invented integral pressure relief assembly of FIG. 4 in a state of creating a low-pressure state within the bearing shaft of the roller assembly of FIG. 4;

FIG. 9 is a detailed cut-away side view of the first preferred embodiment of the invented integral pressure relief assembly of FIG. 4 in a state of receiving lubricant under pressure into the roller assembly of FIG. 4;

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is understood that the word "exemplary" is used herein to mean "serving as an example, instance, or illustration." Any aspect described herein as "exemplary" is not necessarily to be construed as exclusive, preferred or advantageous over other aspects.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1A:
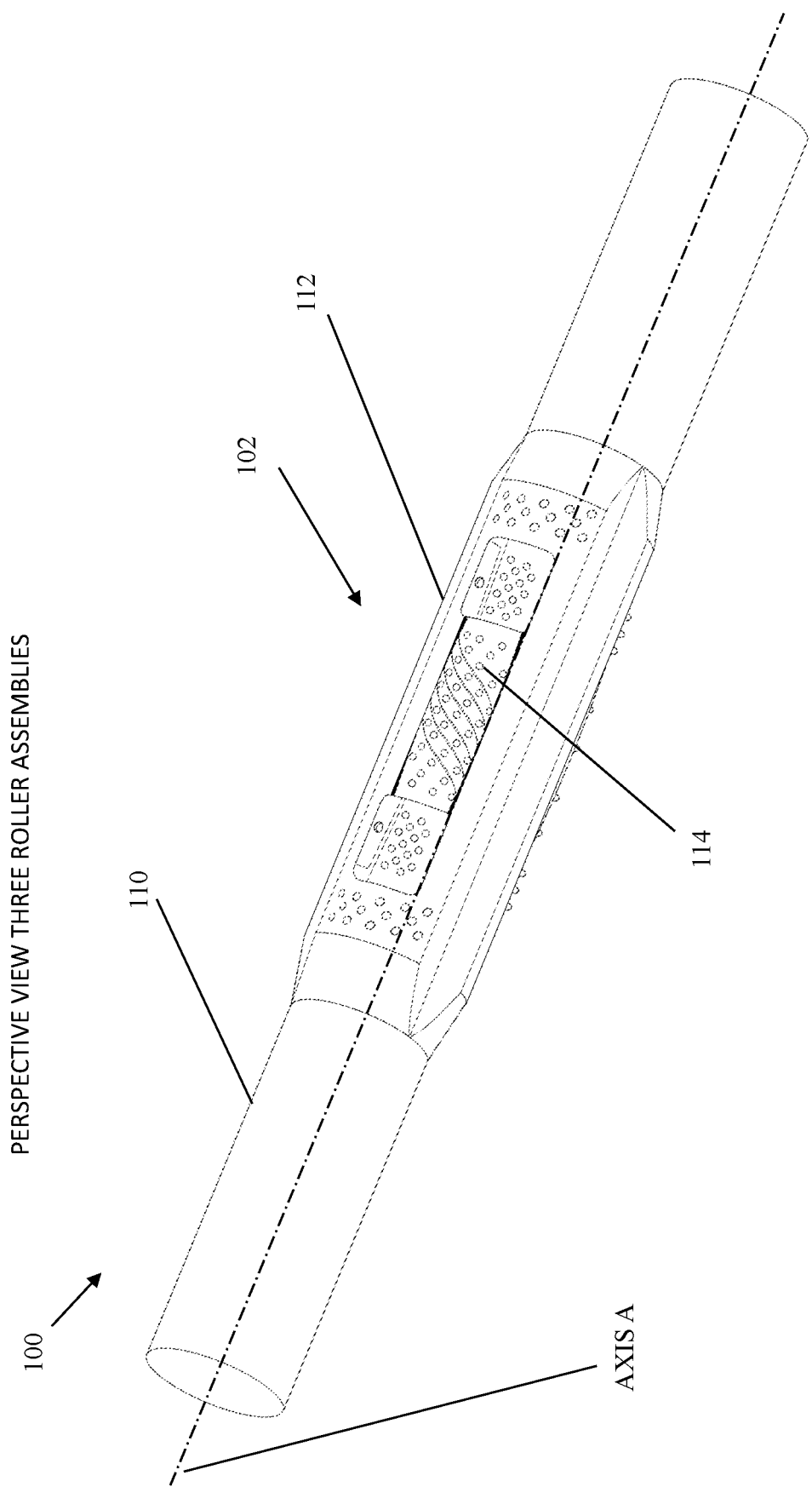
FIG. 1A is a side perspective view of a first preferred embodiment of the present invention (hereinafter, "first roller reamer") having three invented roller assemblies rotatably coupled within separate and individual axial recesses of a same tool body.
Figure 1B:
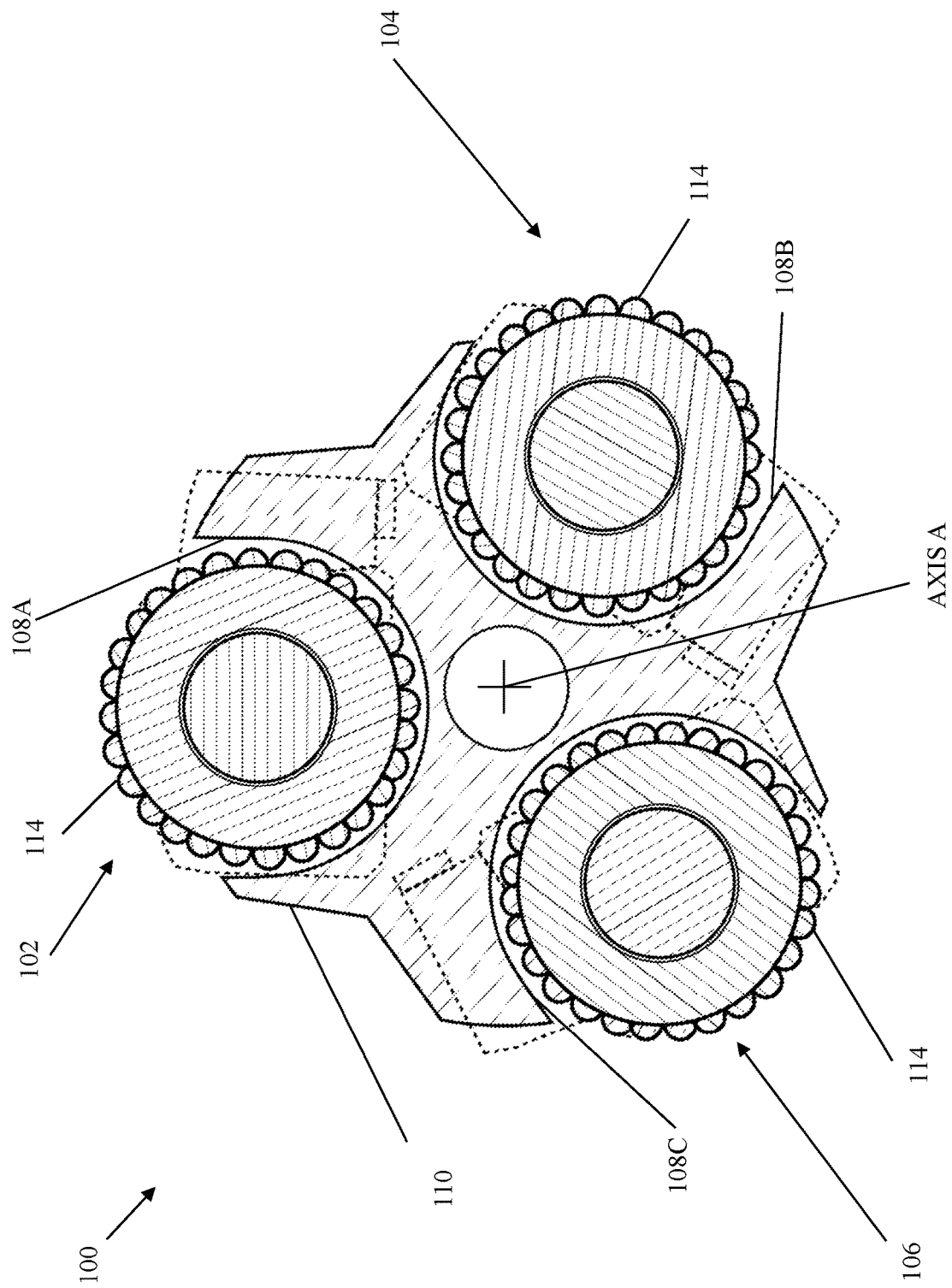
FIG. 1B is a top view cut-away view of the first roller reamer of FIG. 1A having three invented roller assemblies rotatably coupled within separate and individual axial recesses of the tool body of FIG. 1A.

Referring now generally to the Figures particularly to FIG. 1A and FIG. 1B, FIG. 1A is a top view of a first preferred embodiment of the invented roller reamer 100 (hereinafter, "the first reamer" 100) having three roller assemblies 102, 104 & 106 rotatably and removably coupled within separate and individual axial recesses 108A, 108B & 108C (as shown in FIG. 1B) of a tool body 110. A central tool axis A of the tool body 110 (hereinafter, "the tool axis A") extends centrally to a first preferred embodiment of an invented roller assembly 102 (hereinafter, "the first roller assembly" 102) along an elongate dimension of the tool body 110. For the sake of clarity of explanation the means of retaining of each individual cutter cartridge 112 of each of the three roller assemblies 102, 104 & 106 within the individual axial recesses of the tool body 110 are not presented fully in either FIG. 1A or FIG. 1B and are disclosed in detail at least in the text accompanying FIGS. 3, 4A and 4B. Each roller assembly 102, 104 & 106 includes a plurality of cutting inserts 114. One or more of the cutting inserts of the plurality of cutting inserts 114 may be or comprise tungsten carbide, polycrystalline diamond, or other suitable abrasive material known in the art.

Figure 2:
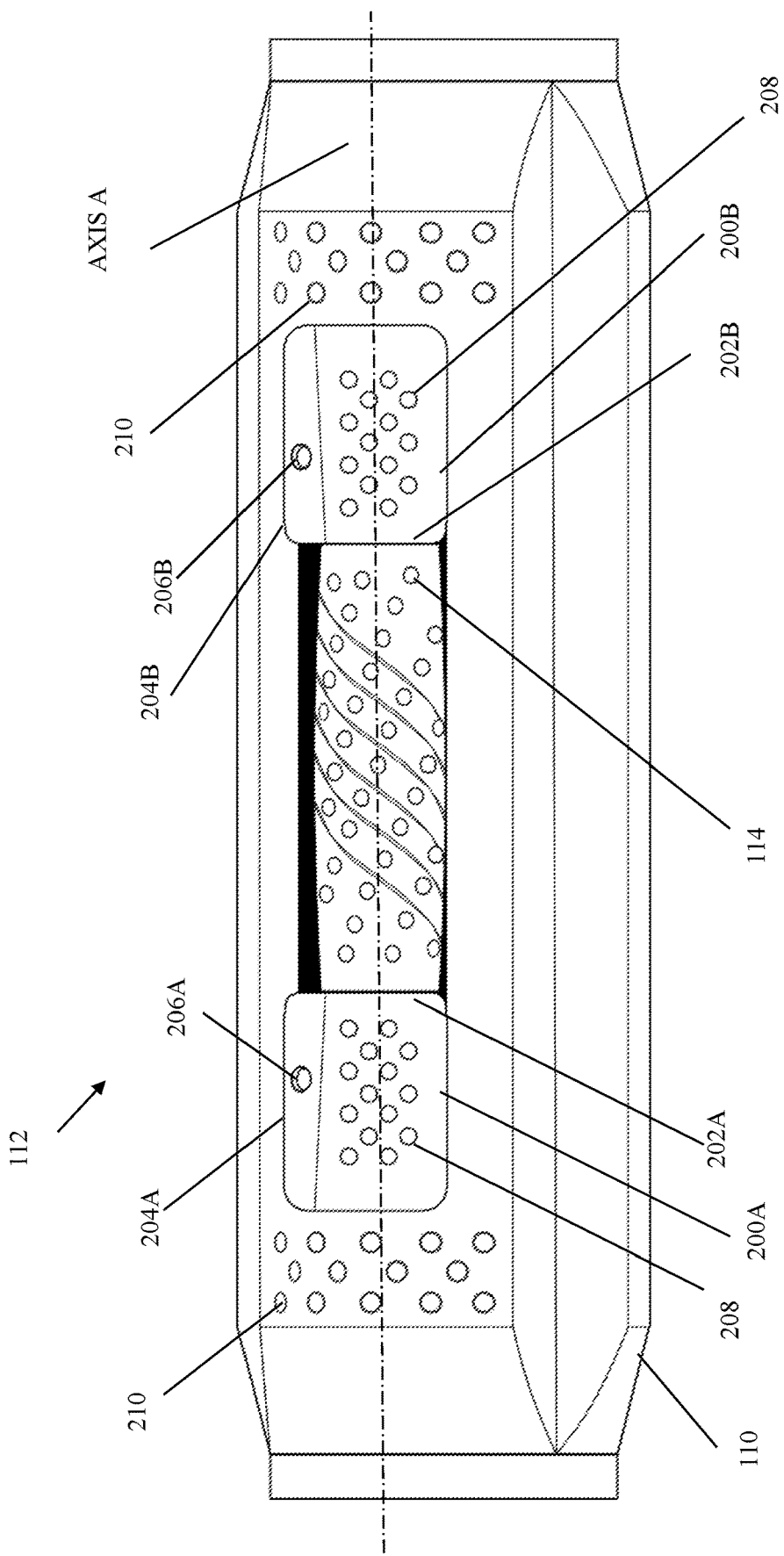
FIG. 2 is a side view of an exemplary roller assembly of FIG. 1A inserted into an exemplary axial recess of the tool body of FIG. 1A and rotatably coupled with a pair of pillow blocks of a first retention assembly.

Referring now generally to the Figures particularly to FIG. 2, FIG. 2 is a side view of the first roller assembly 102 of FIG. 1A inserted into the first exemplary axial recess 108A of the tool body 110 of FIG. 1A. A pair of pillow blocks 200A & 200B are rotatably coupled with the first roller assembly 102. A first pillow block 200A is positioned at a first end 202A the first roller assembly 102. A first wedge 204A is removably coupled to the tool body 110 by a first bolt 206A.

A second pillow block 200B is positioned at a second end 202B of the first roller assembly 102. A second wedge 204B is removably coupled by a second bolt 206B to the tool body 110. The first wedge 204A and the second wedge 204B are sized and shaped to be respectively detachably attached by the bolts 206A & 206B to the tool body 110 to retain the pair of pillow blocks 200A & 200B and the first roller assembly 102 within the first axial recess 108A when the pair of pillow blocks 200A & 200B with the first roller assembly 102 are rotatably and detachably coupled. The pair of wedges 204A & 204B are sized and shaped to lock each respective pillow block 200A & 200B and coupled first roller assembly 102 in the axial and radial directions within the first axial recess 108A.

A second plurality of cutting inserts 208 are positioned on an external side the pillow blocks 200A & 200B, and a third plurality of cutting inserts 210 are positioned on an external side of the tool body 110. One or more of the cutting inserts of the second plurality of cutting inserts 208 or third plurality of cutting inserts 210 may be or comprise tungsten carbide, polycrystalline diamond, or other suitable abrasive material known in the art.

Figure 3:
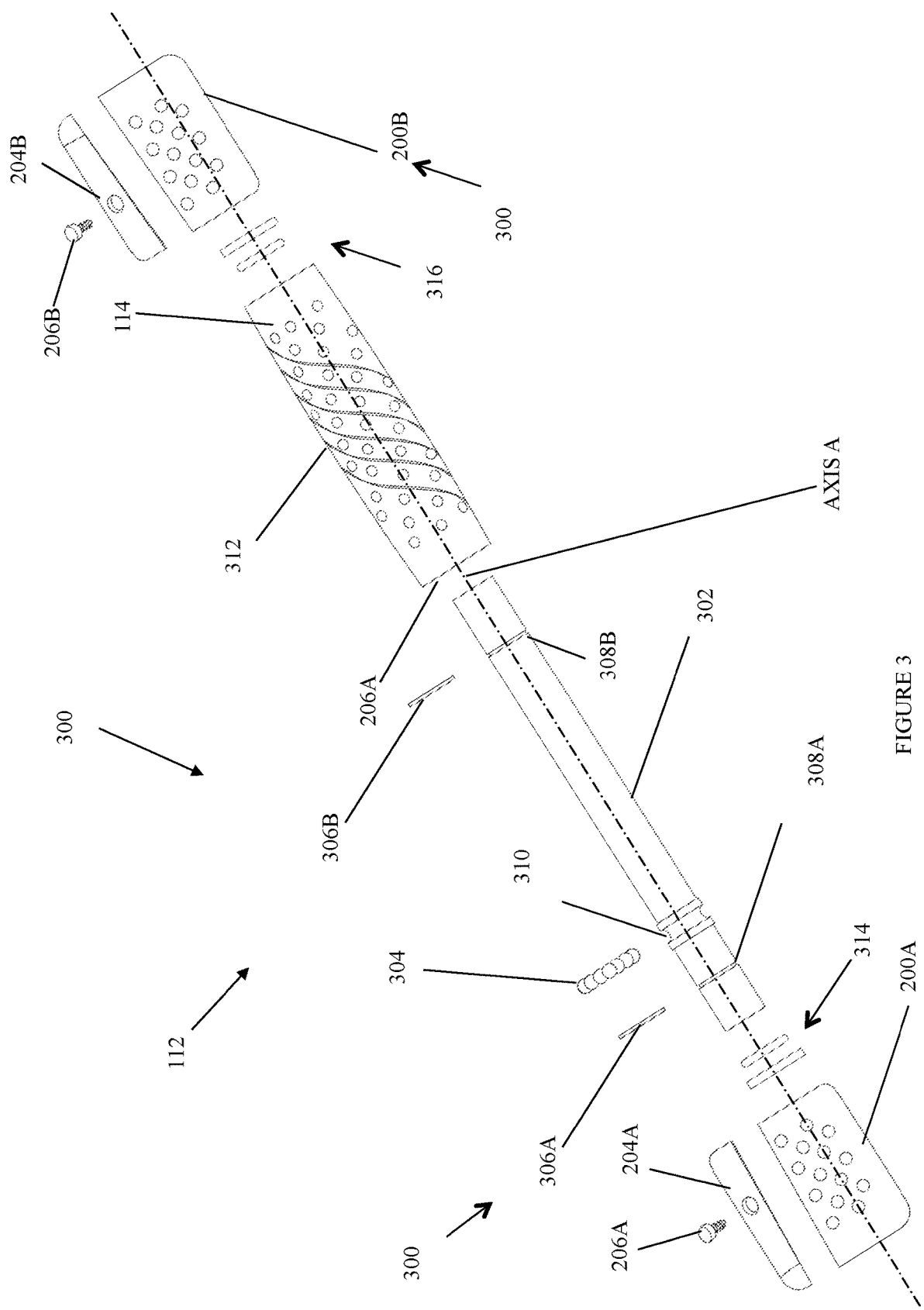
FIG. 3 is an exploded detailed side view of the exemplary first roller assembly of FIG. 2 and elements of the cutter cartridge of FIG. 2.

Referring now generally to the Figures particularly to FIG. 3, FIG. 3 is an exploded detailed side view of the cutter cartridge 112 of the first roller assembly 102 and elements of an exemplary first retention assembly 300. The first retention assembly 300 of the first roller assembly 102 includes the pair of pillow blocks 200A & 200B, the first wedge 204A and the second wedge 204B, a bearing shaft 302, a plurality of ball bearings 304, and the two shaft seal O-rings 306A & 306B. The bearing shaft 302 is fixedly coupled to the pair of pillow blocks 200A & 200B by pins (not shown) and is shaped to form a first shaft seal groove 308A, a second shaft seal groove 308B and a partial shaft race 310. The first shaft seal groove 308A is sized and shaped to partially seat the a first shaft seal O-ring 306A and the second seal groove 308B is sized and shaped to partially seat the second shaft seal O-ring 306A while a first roller cutter 312 of the first roller assembly 102 is positioned about the bearing shaft 302 and the bearing shaft 302 is coupled to the pair of pillow blocks 202A& 202B. The partial shaft race 310 is also sized and shaped to partially seat the plurality of ball bearings 304 while the first roller cutter 312 is positioned about the bearing shaft 302 and the bearing shaft 302 is coupled to the pair of pillow blocks 202A & 202B.

Figure 4:
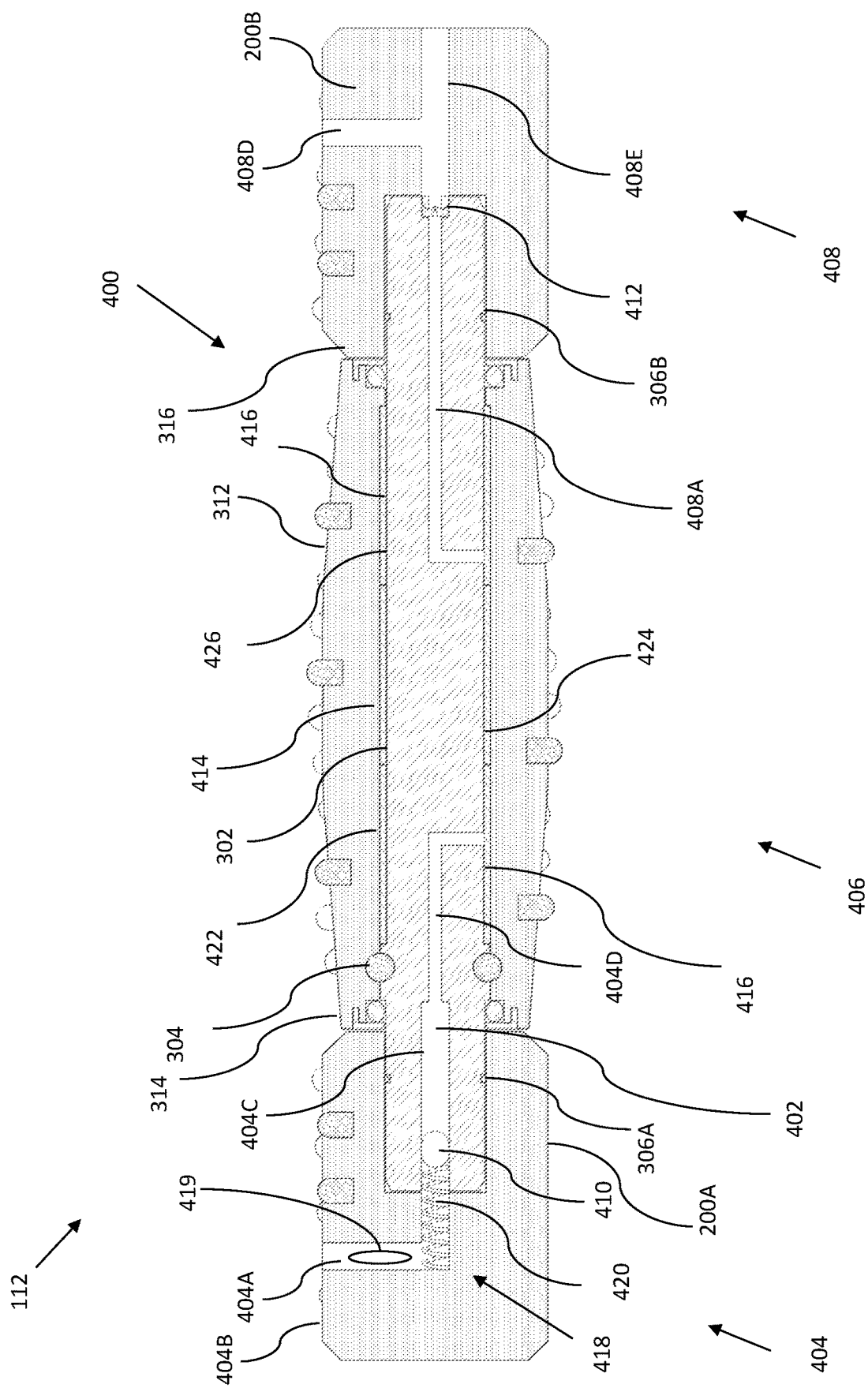
FIG. 4 is a detailed cut-away side view of the exemplary first roller assembly of FIG. 2 and presenting a first preferred embodiment of the invented integral pressure relief assembly.

FIG. 3 further presents an exemplary first labyrinth seal 314, an exemplary second labyrinth seal 316 and the first roller cutter 312. The first roller cutter 312 is comprised within the first roller assembly 102 and includes the plurality of cutting inserts 114. The bearing shaft 302 is sized and shaped to fit within the first labyrinth seal 314, the second labyrinth seal 316, an internal channel 318 of the first roller cutter 312 (as shown in FIG. 4) and partly within each of the pillow blocks 200A & 200B.

Referring now generally to the Figures and particularly to FIG. 4, first roller assembly 102 is shown in a detailed cut-away view that presents a first preferred embodiment of the invented integral pressure relief assembly 400 (hereinafter, "the first assembly" 400) extends through the (a.) first pillow block 200A, (b.) the bearing shaft 302, (c.) the spaces defined between the bearing shaft 302, the roller cutter 312, and the pair of pillow blocks 200A & 200B; and (d.) the second pillow block 200B. More particularly, the first assembly 400 includes a volume of lubricant 402, a reservoir section 404, an interstitial volume 406 and a pressure relief section 408. In operation of the first roller assembly 102 within a borehole (not shown), the volume of lubricant 402 is contained and maintained under pressure between an elastomeric piston 410 of the reservoir section 402 and a pressure relief valve 412 of the pressure relief section 408.

In operation of the first assembly 400 within a borehole, the elastomeric piston 410 is pressed against the volume of lubricant 402 by pressure provided by both a spring component 420 of the string element 418 and by an ambient pressure received from an external mud 421 (hereinafter, "the mud" 421) of the borehole environment. The spring element 418 includes the spring component 420 that delivers compressive force to the elastomeric piston 410. It is understood that the mud 419 may be or comprise debris, slurry, sediments, water, and/or materials introduced into the borehole in a drilling process.

The pressure relief valve 412 releases portions of the volume of lubricant 402 from containment within the bearing shaft 302 and toward the second pillow block 200B when an internal pressure received from the volume of lubricant 402 via the bearing shaft 302 exceeds the ambient pressure received by the pressure relief valve 412 via the second pillow block 200B by a preferably predetermined differential pressure value. It is understood that the predetermined differential pressure value is determined by selectable design parameters of the predetermined differential pressure value, to include (a.) the shape of the pressure relief valve 412; (b.) the hardness value of the material selected to form the pressure relief valve 412; and (c.) one or more punctures made through the pressure relief valve 412 in a process of inserting the volume of lubricant 402 into the first assembly 400.

The reservoir section 404 includes a mud input channel 404A that extends from an exterior side 404B of the first pillow block 200A and to a spring travel channel 404C of the first pillow block 200A. The spring travel section 404C is adapted to house some or all of the spring element 418 and additionally the elastomeric piston 410 when the pressure of the volume of lubricant 402 is sufficient to overcome the combined pressure of the spring component 420 and pressure received from the mud 421 of the ambient environment as applied to the elastomeric piston 410 and whereby the volume of lubricant 402 may push the elastomeric piston 410 from the bearing shaft 302 and into the spring travel channel 404C of the first pillow block 200A. In operation within the borehole (not shown) the spring component 420 is preferably maintained under compressive pressure between the elastomeric piston 410 and the first pillow block 200A. It is understood that the elastomeric piston 410 may be or comprise a spheroid, and/or present a spheroid shape when uncompressed, and further that the elastomeric piston 410 is preferably oversized in comparison to the diameter of a spring travel channel 404C and is adapted to slide within the spring travel channel 404C as driven by force received a spring component 420 of the spring element 418.

The elastomeric piston 410 is sized and shaped to slide within the spring travel channel 404C and within the bearing shaft 302 while inhibiting mud 421 from extending from the spring travel channel 404C and into the volume of lubricant 402 contained within the bearing shaft 302.

The reservoir section 404 further comprises a shaft reservoir 404C and a first shaft channel 404D that contains a portion of the volume of lubricant 402 extending between the elastomeric piston 410 and the interstitial volume 406, whereby the bearing shaft channel 404D enables portions of the volume of lubricant 402 to travel from the bearing shaft reservoir 404C and into the interstitial volume 406 as driven by the pressure received from the elastomeric piston 410.

Figure 13:
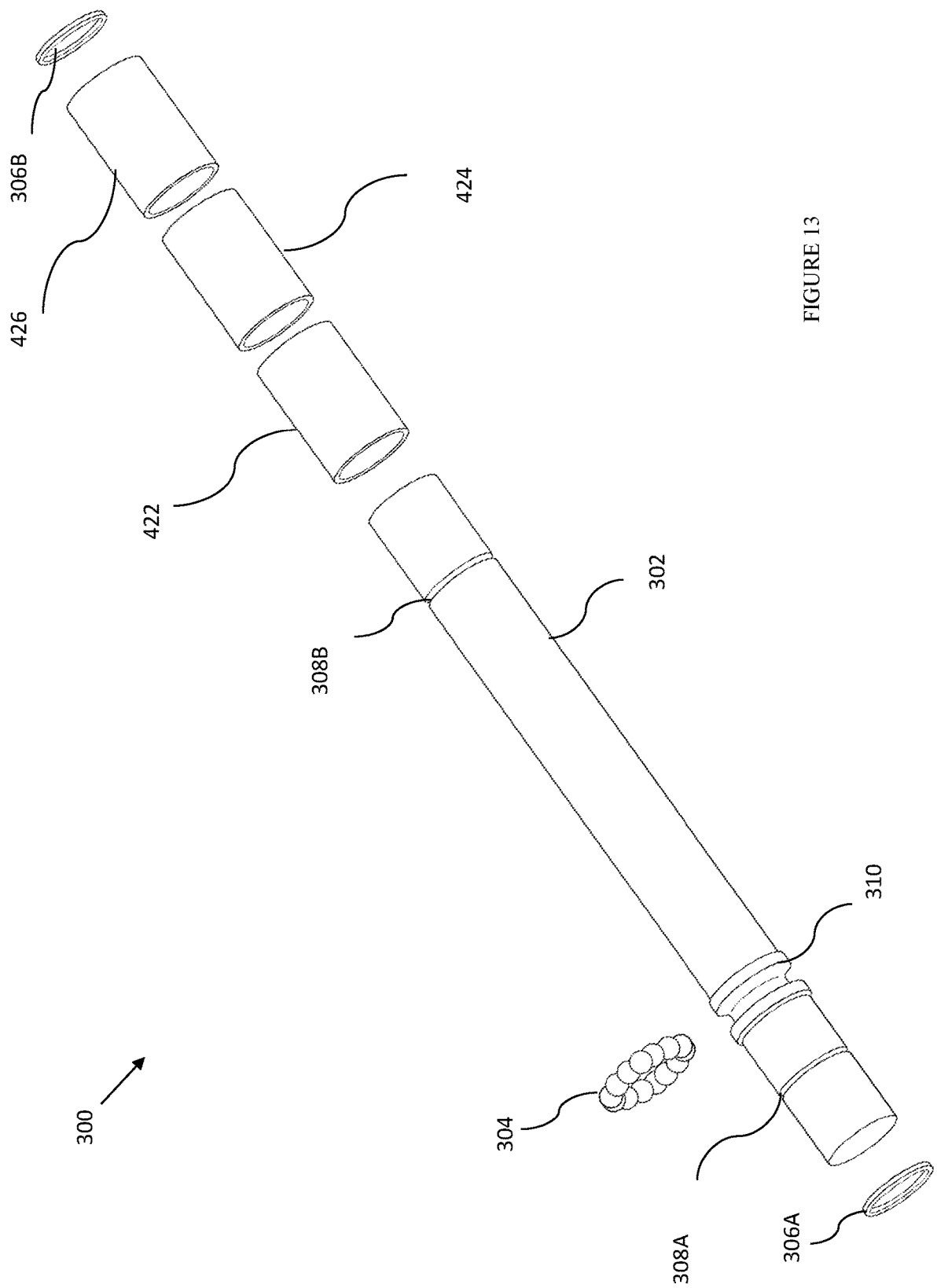
FIG. 13 is an exploded detailed perspective view of elements of the exemplary first roller assembly of FIG. 2 and showing the three additional shaft bushings of FIG. 4.

Referring now generally to the Figures and particularly to FIG. 3, FIG. 4 and FIG. 13, the interstitial volume 406 is formed and defined by an inner roller channel surface 414 of the roller cutter 312 that extends between and is bounded by the labyrinth seals 314 & 316, an exterior shaft surface portion 416 of the bearing shaft 302 that extends between and is bounded by the labyrinth seals 314 & 316 when the cutter cartridge 112 is assembled, the plurality of ball bearings 304, and optionally a set of three shaft bushings 422, 424 & 426.

Figure 5:
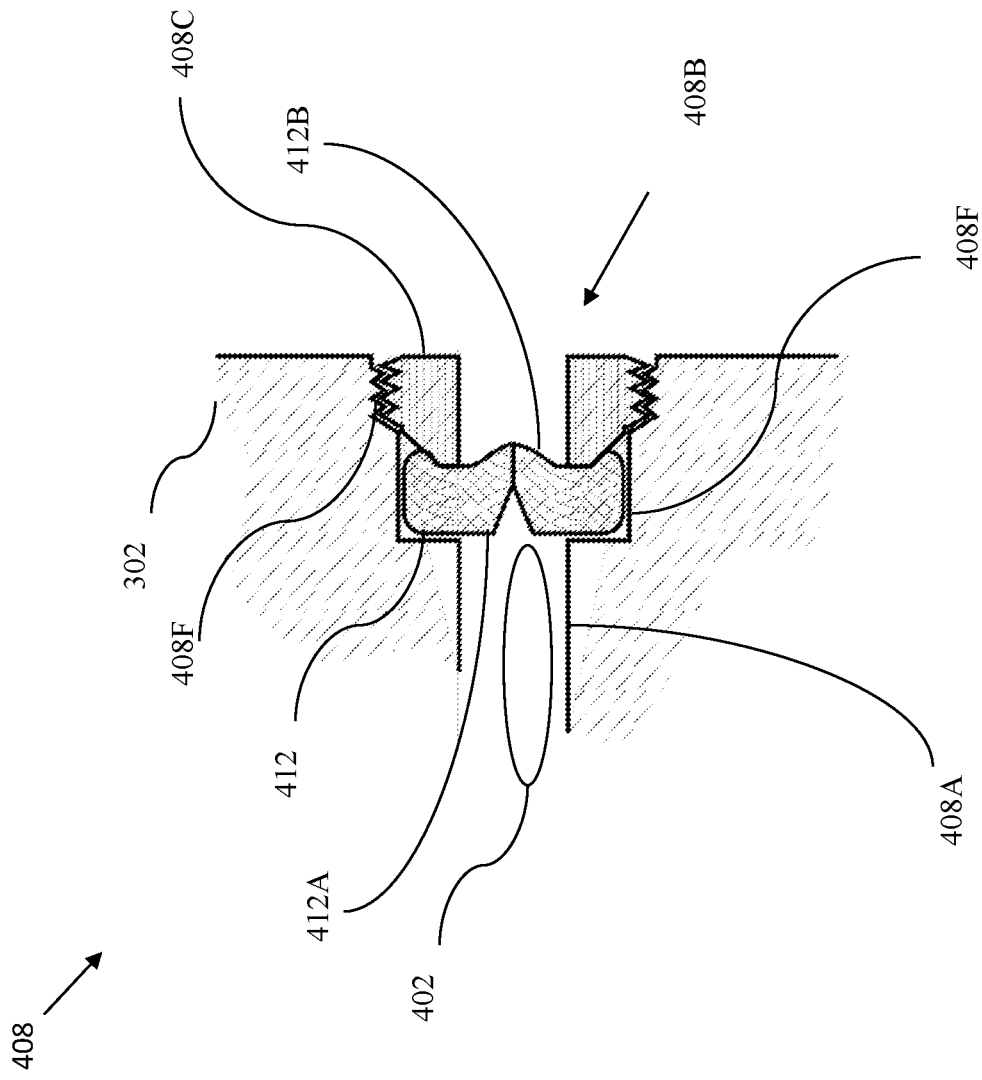
FIG. 5 is a detailed cut-away side view of an invented relief valve operationally positioned within the invented integral pressure relief assembly of FIG. 4.

Referring now generally to the Figures and particularly to FIG. 4 and FIG. 5, the pressure relief section 408 includes a second shaft channel 408A that extends from the interstitial volume 406 and wholly through the bearing shaft 302 and towards the second pillow block 200B, a partially tapped relief valve groove 408B, the pressure relief valve 412, an annular set crew 408C, an ambient mud channel 408D of the second pillow block 200B, and an access channel 408E of the second pillow block 200B. The partially tapped relief groove 408B is sized and shaped to house both the pressure relief valve 412 and the annular set crew 408C in an operational orientation within the pressure relief section 408 as shown in FIG. 3. A tapped portion 408F of the partially tapped relief groove 408B and the annular set crew 408C are sized and shaped to form a detachable interference barrier and to secure the pressure relief valve 412 within the bearing shaft 302. The second shaft channel 408A permits the volume of lubricant 402 to flow up to and apply pressure against an interior valve side 412A of the pressure relief valve 412. The ambient mud channel 408D and the access channel 408E of the second pillow block 200B enable mud 421 from the external borehole environment surrounding the invented reamer 100 to reach and apply pressure against an exterior side valve of the pressure relief valve 412. The access channel 408E accepts any portion of the volume of lubricant 402 that is released through the pressure relief valve 412 from the bearing shaft 302.

Referring now generally to the Figures and particularly to FIGS. 6A through 6D, FIG. 6A is a detailed cut-away side view of the invented relief valve 412. The characteristics that determine a differential pressure that when evidenced between the interior valve side 412A and the exterior valve side 412B will cause the pressure relief valve 412 to release a portion of the volume of lubricant 402 from inside the bearing shaft 302 and into the second pillow block 200B are determined at least in part by the (1.) the material composition of the pressure relief valve 412, (2.) the shape and size of a valve body 412C of the pressure relief valve 412, to include the resting shape of an internal side valve angle $\alpha 1$; and (3.) the size and shape of the release pathway 412D that provides a channel for acceptance and release of the volume of lubricant 402 and extends wholly through the valve body 412C from the interior valve side 412A to the exterior valve side 412B. It is understood that the size and shape of the release pathway 412D is preferably determined by a puncturing of the valve body 412C that occurs in the process of inserting the volume of lubricant 402 under pressure through the release pathway 412D relief valve and into the first assembly 400.

Figure 6A:
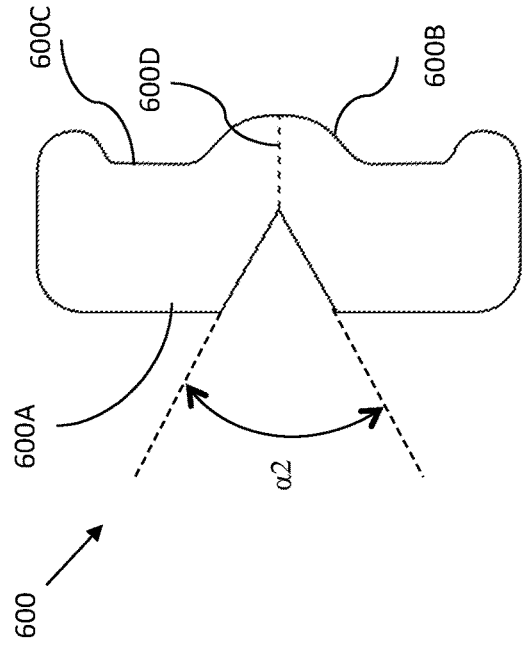
FIG. 6A is a detailed cut-away side view of the invented relief valve of FIG. 5.
Figure 6B:
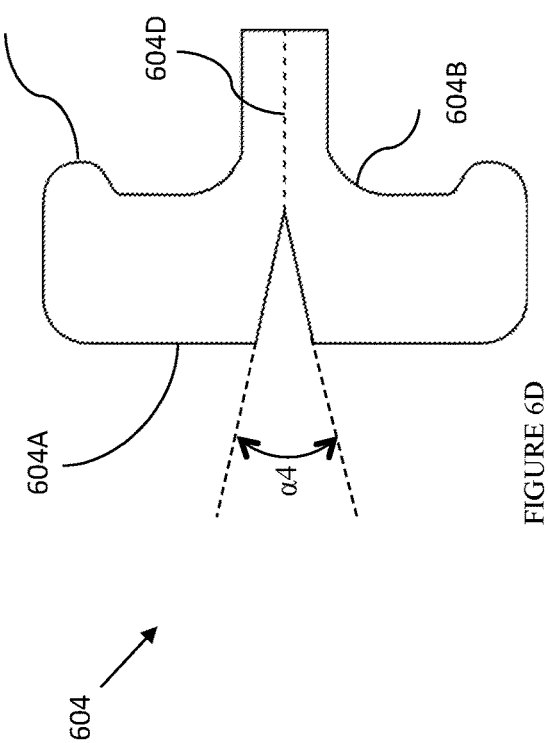
FIG. 6B is a detailed cut-away side view of an alternate embodiment of the invented relief valve of FIG. 6A.

Referring now generally to the Figures and particularly to FIG. 6B, FIG. 6B is a detailed cut-away side view of an alternate preferred embodiment of the invented relief valve 600 (hereinafter, "the alternate valve 600"). It is understood that the characteristics that determine a fourth differential pressure, that when evidenced between a fourth valve interior side 600A of the alternate valve 600 and an alternate valve exterior side 600B the alternate valve 600, will cause the alternate valve 600 to release a portion of the volume of lubricant 402 from inside the bearing shaft 302 and into the second pillow block 200B, are determined at least in part by the (1.) the material composition of the alternate valve 600, (2.) the shape and size of an alternate valve body 600C of the alternate valve 600, to include the resting shape of an alternate internal side valve angle $\alpha 2$; and (3.) the size and shape of an alternate release pathway 600D that provides a channel for acceptance and release of the volume of lubricant 402 and that extends wholly through the alternate valve body 600C from the alternate valve interior side 600A to the alternate valve exterior side 600B. It is understood that the size and shape of the alternate release pathway 600D is preferably determined by a puncturing of the alternate valve body 600C that occurs in the process of inserting the volume of lubricant 402 under pressure through the alternate release pathway 600D of the alternate relief valve 600 and into the first assembly 400.

Figure 6C:
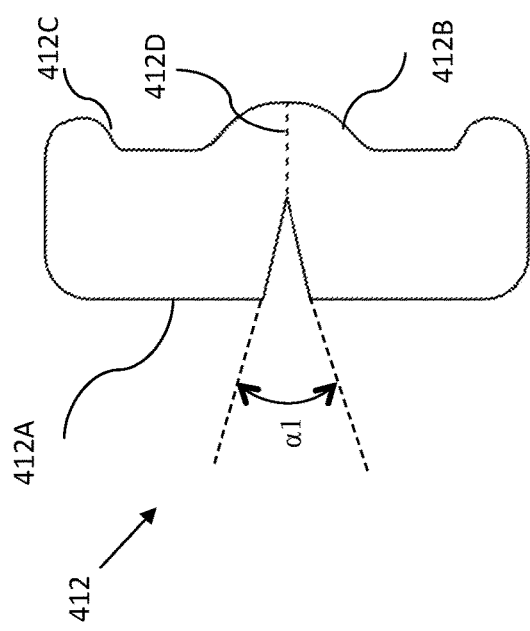
FIG. 6C is a detailed cut-away side view of an additional alternate embodiment of the invented relief valve of FIG. 6A.

Referring now generally to the Figures and particularly to FIG. 6C, FIG. 6C is a detailed cut-away side view of a third alternate preferred embodiment of the invented relief valve 602 (hereinafter, "the third valve 602"). It is understood that the characteristics that determine a third differential pressure, that when evidenced between a third valve interior side 602A of the third valve 602 and a third valve exterior side 602B the third valve 602, will cause the third valve 602 to release a portion of the volume of lubricant 402 from inside the bearing shaft 302 and into the second pillow block 200B are determined at least in part by the (1.) the material composition of the third valve 602, (2.) the shape and size of a third valve body 602C of the third valve 602, to include the resting shape of a third internal side valve angle $\alpha 3$; and (3.) the size and shape of a third release pathway 602D that provides a channel for acceptance and release of the volume of lubricant 402 and that extends wholly through the third valve body 602C from the third valve interior side 602A to the third valve exterior side 602B. It is understood that the size and shape of the third release pathway 602D is preferably determined by a puncturing of the third valve body 602C that occurs in the process of inserting the volume of lubricant 402 under pressure through the third release pathway 602D of the third relief valve 602 and into the first assembly 400.

Figure 6D:
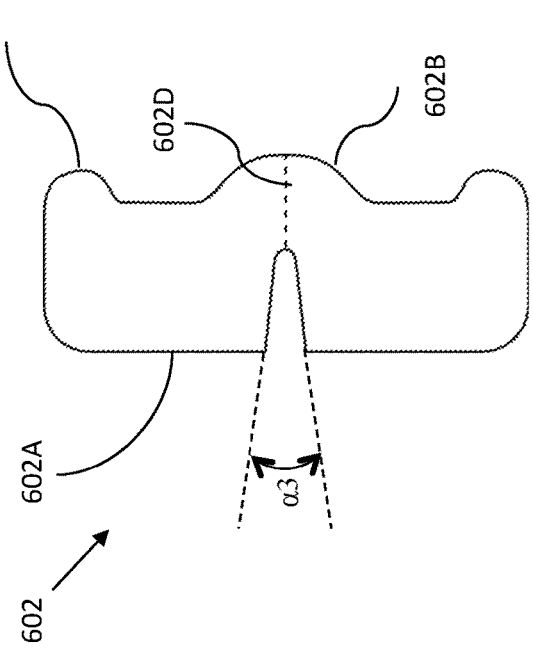
FIG. 6D is a detailed cut-away side view of a third alternate embodiment of the invented relief valve of FIG. 6A.

Referring now generally to the Figures and particularly to FIG. 6D, FIG. 6D is a detailed cut-away side view of a fourth alternate preferred embodiment of the invented relief valve 604 (hereinafter, "the fourth valve 604"). It is understood that the characteristics that determine a fourth differential pressure when evidenced between a fourth valve interior side 604A of the fourth valve 604 and a fourth valve exterior side 604B the fourth valve 604 that will cause the fourth valve 604 to release a portion of the volume of lubricant 402 from inside the bearing shaft 302 and into the second pillow block 200B are determined at least in part by the (1.) the material composition of the fourth valve 604, (2.) the shape and size of a fourth valve body 604C of the fourth valve 604, to include the resting shape of an fourth internal side valve angle $\alpha 3$; and (3.) the size and shape of a fourth release pathway 604D that provides a channel for acceptance and release of the volume of lubricant 402 and that extends wholly through the fourth valve body 604C from the fourth valve interior side 604A to the fourth valve exterior side 604B. It is understood that the size and shape of the fourth release pathway 604D are preferably determined by a puncturing of the fourth valve body 604C that occurs in the process of inserting the volume of lubricant 402 under pressure through the fourth release pathway 604D of the fourth relief valve 604 and into the first assembly 400.

It is understood that each of the pressure relief valves 412, 600, 602 & 604 are shaped and sized to fit within the partially tapped relief valve groove 408B and thereupon be maintained under compression within the bearing shaft 302 by the annular set screw 408C. It is further understood that the annular screw 408C may be positioned within the partially tapped relief valve groove 408B with a screw driver (not shown) that engages with the annular screw 408C or other suitable means known in the art.

Figure 7:
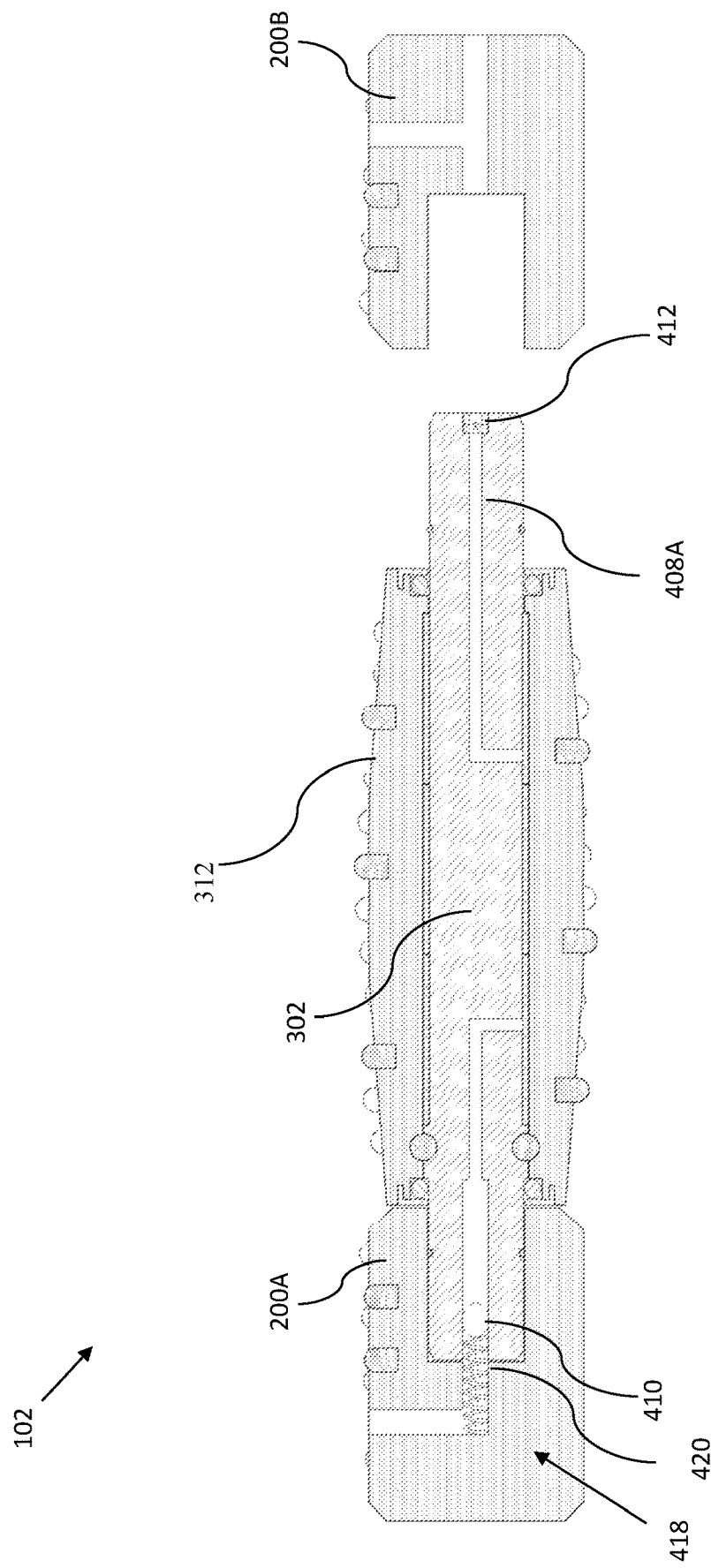
FIG. 7 is a detailed cut-away side view of the first preferred embodiment of the invented integral pressure relief assembly of FIG. 4 in a state with a pillow block detached of FIG. 3 from the bearing shaft of FIG. 3.

Referring now generally to the Figures and particularly to FIG. 7, FIG. 7 is a detailed cut-away side view the first roller assembly 102 in an optional detached state wherein the second pillow block 200B is detached from the bearing shaft 302 in order to enable easier access to install a pressure relief valve 412, 600, 602 & 604 and/or drive the volume of lubricant 402 under pressure through an installed pressure relief valve 412, 600, 602 & 604.

Referring now generally to the Figures and particularly to FIG. 8, FIG. 8 is a detailed cut-away side view of the first assembly 400 creating a low-pressure state within the bearing shaft 302 and the interstitial volume 406 of the first roller assembly 102. A vacuum pump 800 is fitted with an annular vacuum needle 802. The annular vacuum needle 802 punctures the installed pressure valve 412, or another installed pressure relief valve 600, 602 & 604, as one of the alternate pressure relief valves 412, 600, 602 & 602 is installed within the partially tapped relief groove 408B. The vacuum pump 800 is then applied to impose a low pressure state between the elastomeric piston 410 and the interior valve side 412A of the valve 412 and within the interstitial volume 406.

Referring now generally to the Figures and particularly to FIG. 9, FIG. 9 is a detailed cut-away side view of the first assembly 400 in a state of receiving the volume of lubricant 402 under pressure from a lubricant source device 900 by means of a puncturing through the first valve body 412C by a first annular source needle 902 and transferring a magnitude of the volume of lubricant 402 into the first assembly 400. It is understood that the puncturing of the first valve body 412C by the first annular source needle 902 preferably fully forms the release pathway 412D, wherein the effect of any earlier puncturing of the first valve body 412C is subsumed by, incorporated within and/or overwhelmed by the action of puncturing the first valve body 412C with the first annular source needle 902.

The transfer of the volume of lubricant 402 from a lubricant source reservoir 904 of the lubricant source causes the transferred pressured volume of lubricant 402 to be filled into the bearing shaft 302 and the interstitial volume 406 of the first roller assembly 102, between the elastomeric piston 410 and the interior valve side 412A.

When a desired magnitude of the volume of lubricant 402 is inserted in between the elastomeric piston 410 and the interior valve side 412A of the first valve 412, the source needle 902 is removed from the channel 412D of the first valve 412.

It is understood that the lubricant source device 900 may be adapted to puncture one of the alternate valves 600, 602 & 604 and thereby form an alternative channel 600D, 602D & 604D therein, whereby the effect of any earlier puncturing of the selected alternate valve body 600C, 602C & 604C is subsumed by, incorporated within and/or overwhelmed by the action of puncturing the selected valve body 600C, 602C & 604C with the adapted lubricant source device 900.

Figure 10:
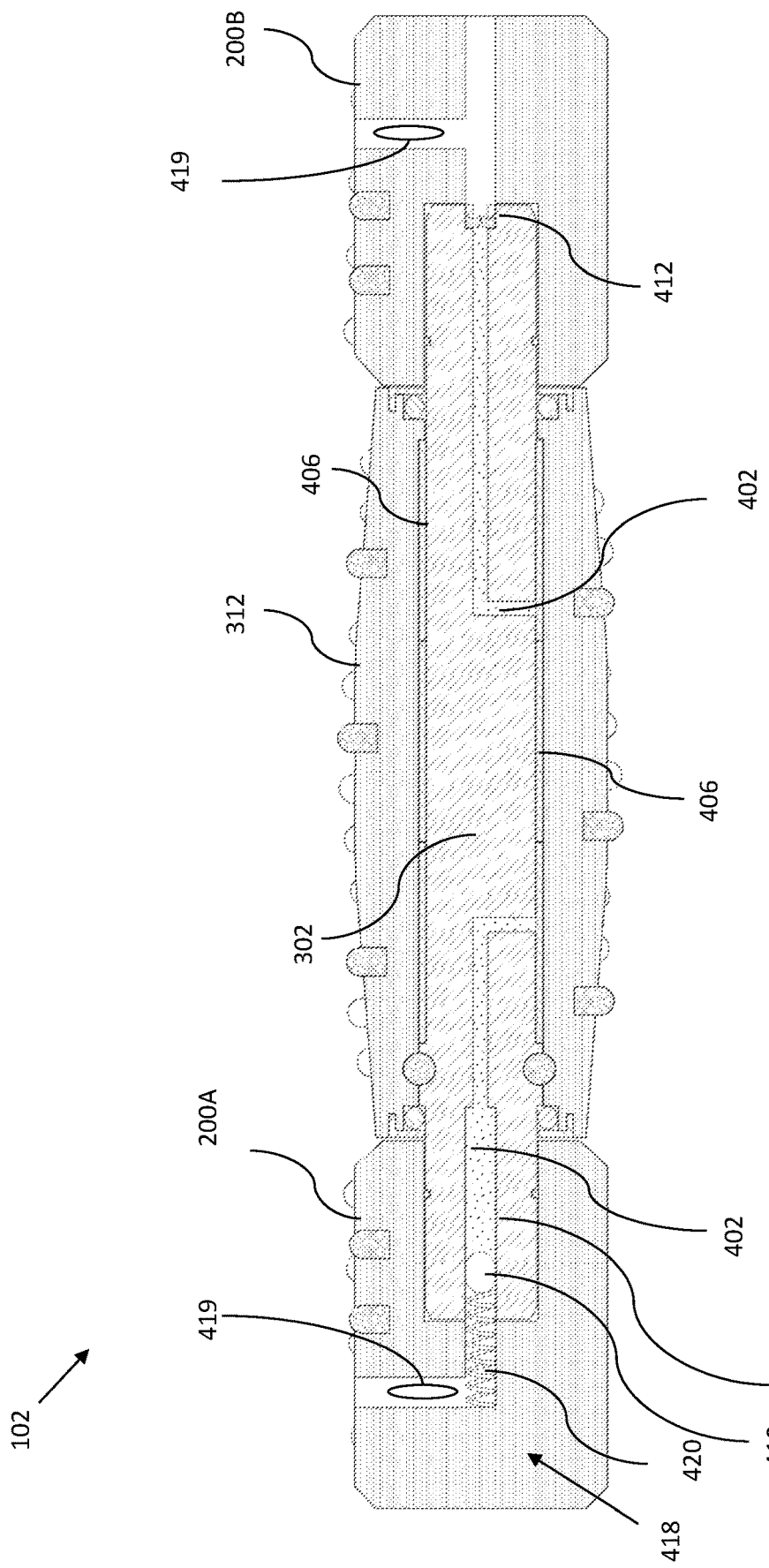
FIG. 10 is a detailed cut-away side view of the first preferred embodiment of the invented integral pressure relief assembly of FIG. 4 in a state of maintaining lubricant under pressure within the roller assembly of FIG. 4.

Referring now generally to the Figures and particularly to FIG. 10, FIG. 10 is a detailed cut-away side view of the first assembly 400 in a state of maintaining the volume of lubricant 402 under pressure within the bearing shaft 302 and the interstitial volume 406, i.e., within the first assembly 400 between the elastomeric piston 410 and the interior valve side 412A. It is noted that the second pillow block 200B is recoupled with the bearing shaft 302 to the cutter cartridge 112 and is fully assembled as presented in FIG. 10. It is understood that in certain alternate preferred embodiments of the method of the present invention that the valve 412 may be substituted with one of the alternative valves 600, 602 & 604.

Figure 11:
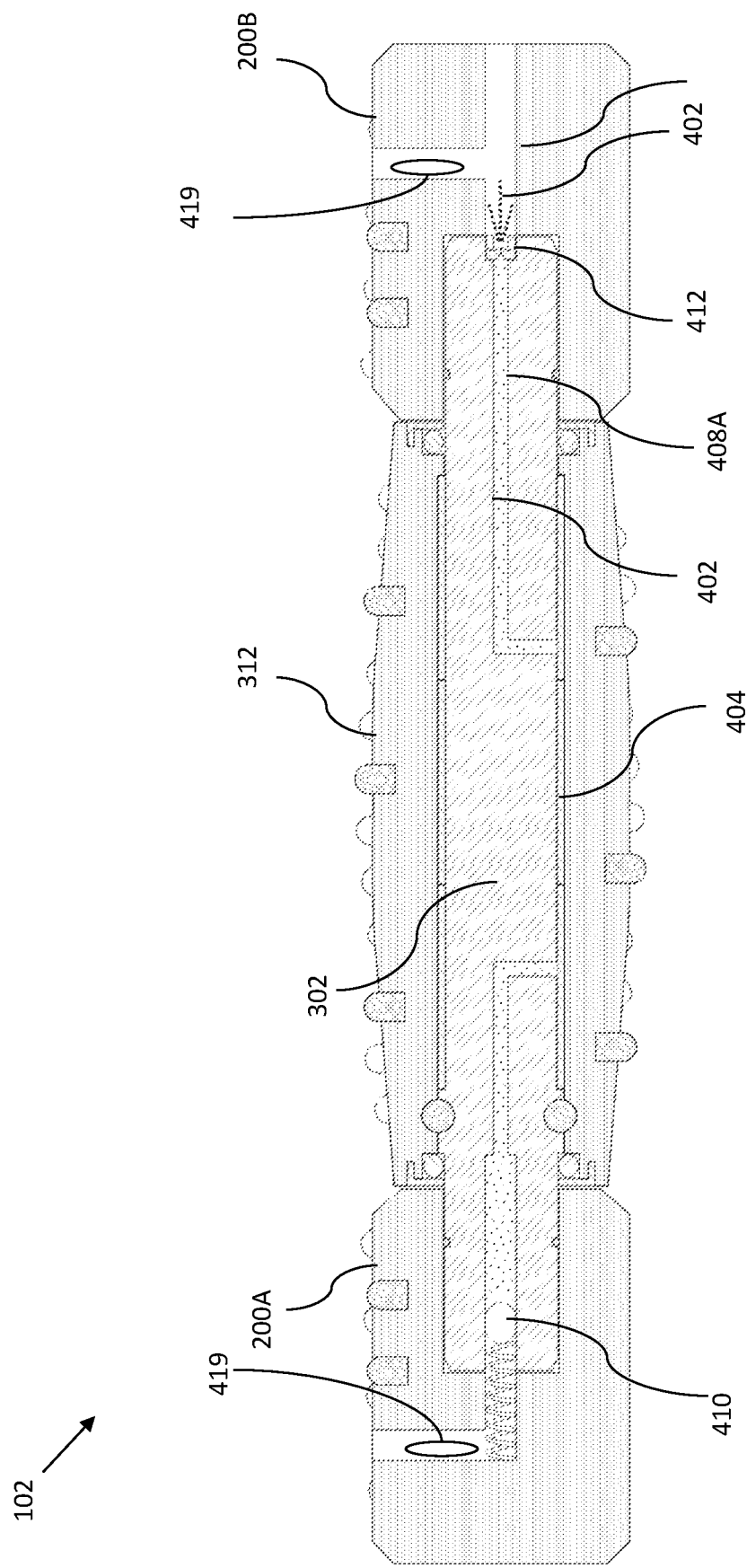
FIG. 11 is a detailed cut-away side view of the first preferred embodiment of the invented integral pressure relief assembly of FIG. 4 in a state of releasing lubricant under pressure from the bearing shaft of FIG. 4.

Referring now generally to the Figures and particularly to FIG. 11, FIG. 11 is a detailed cut-away side view of the first assembly 400 in a state of releasing a portion of the volume of lubricant 402 through the release pathway 412D under pressure from within the bearing shaft 302 and into the access channel 408E of the second pillow block 200B. It is understood that the release of the volume of lubricant 402 from the bearing shaft 302 as presented in FIG. 11 occurs only when the pressure applied by the volume of lubricant 402 exerted against the interior valve side 412A exceeds a certain magnitude of pressure simultaneously exerted by the mud 421 of the borehole environment (not shown) upon the exterior valve side 412B. It is further understood that the pressure manifested by the volume of lubricant 402 contained within the first assembly and between the elastomeric piston 410 and the pressure relief valve 412 increases as this contained volume of lubricant 402 receives heat in the operation of the invented reamer with the borehole (not shown).

Figure 12A:
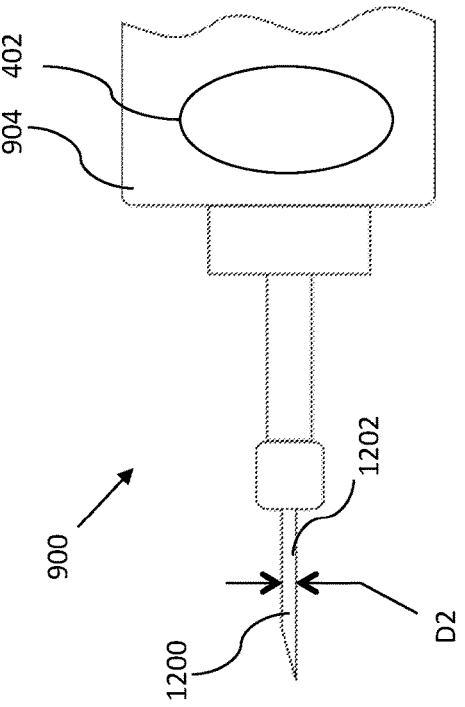
FIG. 12A is a detailed cut-away side view of the lubricant insertion of FIG. 9.
Figure 12B:
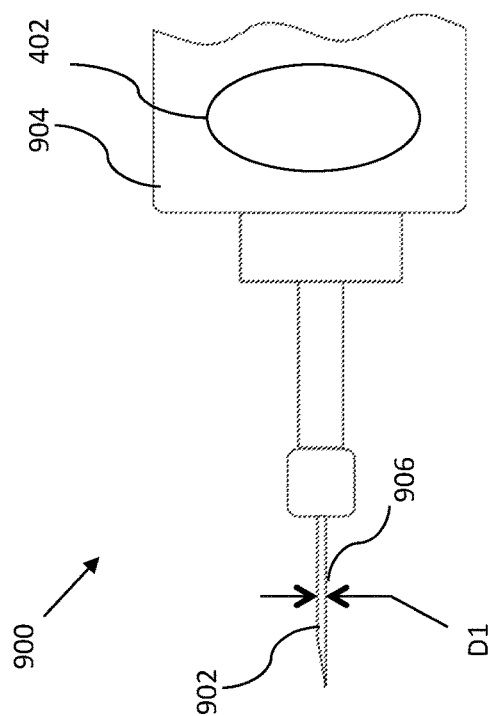
FIG. 12B is a detailed cut-away side view of an alternate embodiment of the lubricant insertion of FIG. 9.
Figure 12C:
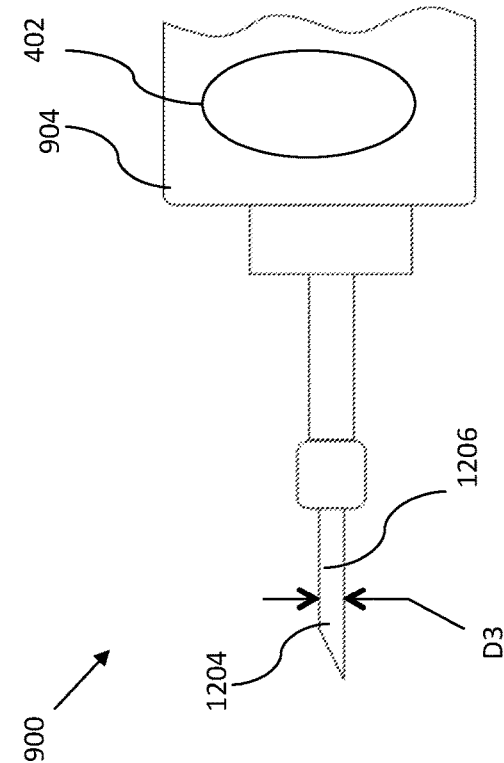
FIG. 12C is a detailed cut-away side view of a second alternate embodiment of the lubricant insertion of FIG. 9.

Referring now generally to the Figures and particularly to FIGS. 12A through 12C, FIG. 12A is a detailed cut-away side view of the lubricant insertion device 900. A first outer needle diameter D1 of the first annular source needle 902 of the lubricant source device 900 at least partly determines the effect upon the valve body 412C in the a formation, deformation and/or reformation of the release pathway 412D that occurs when the first annular source needle 902 is applied to puncture through the valve body 412C. It is understood that the volume of lubricant 402 is transferred through the first relief valve 412 via the 412D by passage through an inner channel 906 of the first annular source needle 902.

Referring now generally to the Figures and particularly to FIGS. 12A through 12C, FIG. 12B is a detailed cut-away side view of an alternate embodiment of the lubricant source device 900 that includes an alternate annular lubricant insertion needle 1200 coupled with the lubricant source reservoir 904. A second outer needle diameter D2 of the alternate annular lubricant insertion needle 1200 at least partly determines the effect upon the alternate valve body 600C in a formation, deformation or reformation of the alternate release pathway 600D that occurs when the alternate annular source needle 1200 punctures through the alternate valve body 600C. It is understood that the volume of lubricant 402 is transferred through the alternate relief valve 600 via the alternate release pathway 600D by passage through an alternate inner channel 1202 of the first alternate annular lubricant insertion needle 1200.

Referring now generally to the Figures and particularly to FIGS. 12A through 12C, FIG. 12C is a detailed cut-away side view of a third embodiment of the lubricant source device 900 that includes a third annular lubricant insertion needle 1204 coupled with the lubricant source reservoir 904. A third outer needle diameter D3 of the third annular lubricant insertion needle 1204 at least partly determines the effect upon the third valve body 602C in a formation, deformation and/or reformation of the third release pathway 600D that occurs when the third annular source needle 1204 is applied to puncture through the third valve body 602C. It is understood that the volume of lubricant 402 transferred through the third relief valve 602 via the alternate release pathway 602D by passage through a third inner channel 1206 of the third alternate annular lubricant insertion needle 1204.

Referring now generally to the Figures and particularly to FIG. 13, FIG. 13 is an exploded detailed perspective view of elements of the exemplary first roller assembly 102 and for the sake of clarity of explanation showing the three additional shaft bushings 422, 424 & 426.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the invented system, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A roller reamer cutter cartridge comprising:
   a roller cutter having an internal channel;
   a bearing shaft extending wholly through the roller cutter internal channel, the bearing shaft comprising:
   a volume of lubricant;
   a spring element applying compressive force to the volume of lubricant;
   a first lubricant channel extending from the spring element to the roller cutter inner channel; and
   a second lubricant channel extending from the roller cutter inner channel to a relief valve, the relief valve adapted to release the lubricant from the shaft when a sufficient differential pressure presents between lubricant contained within the bearing shaft and an external environment.

2. The roller reamer cutter cartridge of claim 1, wherein the relief valve comprises a release pathway extending from inside of the bearing shaft and to the external environment.

3. The roller reamer cutter cartridge of claim 2, wherein the relief valve forms an interior angle, the interior angle extending from an interior side of the relief valve to the release pathway, and the release pathway extending from the interior angle and to external environment.

4. The roller reamer cutter cartridge of claim 3, wherein the release pathway is substantively formed by a puncturing of the relief valve.

5. The roller reamer cutter cartridge of claim 4, wherein the puncturing of the relief valve occurs in a process of inserting the lubricant into the bearing shaft.

6. The roller reamer cutter cartridge of claim 1, further comprising a channel extending from an exterior of the roller reamer cutter cartridge and to the spring element.

7. The roller reamer cutter cartridge of claim 6, further comprising a first pillow block, the first pillow block detachably positioned at a first end of the bearing shaft and the channel extending through the first pillow block and to the spring element.

8. The roller reamer cutter cartridge of claim 7, further comprising a second pillow block, the second block detachably positioned at a second end of the bearing shaft and proximate to the relief valve.

9. The roller reamer cutter cartridge of claim 8, wherein the second pillow block comprises an exit channel extending from an exterior side of the relief valve and to the external environment.

10. The roller reamer cutter cartridge of claim 1, further comprising at least one bearing bushing, the bearing bushing positioned between the roller cutter and the bearing shaft.

11. The roller reamer cutter cartridge of claim 10, further comprising three bushing, the bearing bushings positioned serially about the bearing shaft and between the roller cutter and the bearing shaft.

12. The roller reamer cutter cartridge of claim 1, wherein the spring element comprises an elastomeric piston and a spring component, the spring component positioned and adapted to apply compressive force onto the elastomeric piston and toward lubricant contained within the first lubricant channel, and the elastomeric piston adapted to slide within the first lubricant channel as driven by force received from the spring component.

13. The roller reamer cutter cartridge of claim 12, wherein the elastomeric piston presents a spheroid when is uncompressed.

14. The roller reamer cutter cartridge of claim 12, further comprising a first pillow block detachably attached at a first end of the bearing shaft and proximate to the spring element, and the spring element extends from the first pillow block and toward lubricant contained within the first lubricant channel.

15. The roller reamer cutter cartridge of claim 12, wherein the elastomeric piston of the spring element when in compression presents a sliding sealing surface within the first lubricant channel.

16. The roller reamer cutter cartridge of claim 12, wherein the spring element extends in parallel with an elongate axis of the shaft bearing.

17. The roller reamer cutter cartridge of claim 12, wherein the relief valve comprises a release pathway extending from inside of the bearing shaft and to the external environment.

18. The roller reamer cutter cartridge of claim 17, wherein the relief valve forms an interior angle, the interior angle extending from an interior side of the relief valve to the release pathway, and the release pathway extending from the interior angle and to external environment.

19. The roller reamer cutter cartridge of claim 17, wherein the release pathway is substantively formed by a puncturing of the relief valve.

20. The roller reamer cutter cartridge of claim 19, wherein the puncturing of the relief valve occurs in a process of inserting the lubricant into the bearing shaft.

21. The roller reamer cutter cartridge of claim 1, wherein the relief valve is adapted to permit release of lubricant from the bearing shaft at a sufficient differential pressure that is lower than a differential pressure required to drive a material from the external environment and into the bearing shaft.

22. The roller reamer cutter cartridge of claim 21, wherein the relief valve forms an interior angle, the interior angle extending from an interior side of the relief valve to the release pathway, and the release pathway extending from the interior angle and to external environment, and the interior angle enabling the relief valve to release lubricant from the bearing shaft at a sufficient differential pressure that is lower than a differential pressure required to drive a material from the external environment and into the bearing shaft.

23. The roller reamer cutter cartridge of claim 22, wherein the relief valve is formed by a material selected with a hardness parameter that enables the relief valve to release lubricant from the bearing shaft at a sufficient differential pressure that is lower than a differential pressure required to drive a material from the external environment and into the bearing shaft.

24. The roller reamer cutter cartridge of claim 22, wherein the relief valve is shaped and sized to enable the relief valve to release lubricant from the bearing shaft at a sufficient differential pressure that is lower than a differential pressure required to drive a material from the external environment and into the bearing shaft.

25. The roller reamer cutter cartridge of claim 22, wherein the release pathway of the relief valve is formed by a puncturing of the relief valve by a needle selected with a diameter that forms the release pathway to support the relief valve releasing lubricant from the bearing shaft at a sufficient differential pressure that is lower than a differential pressure required to drive a material from the external environment and into the bearing shaft.

* * * * *